US012601280B2

(12) United States Patent
Veitch

(10) Patent No.: US 12,601,280 B2
(45) Date of Patent: Apr. 14, 2026

(54) BOSS WITH INTEGRAL FIRE PROTECTION

(71) Applicant: Pratt & Whitney Canada Corp., Longueuil (CA)

(72) Inventor: Thomas Veitch, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/819,023

(22) Filed: Aug. 29, 2024

(65) Prior Publication Data

US 2026/0063051 A1 Mar. 5, 2026

(51) Int. Cl.
*F01D 25/14* (2006.01)

(52) U.S. Cl.
CPC ........ *F01D 25/145* (2013.01); *F05D 2220/32* (2013.01); *F05D 2260/231* (2013.01)

(58) Field of Classification Search
CPC .......................... F01D 25/145; F05D 2260/231
See application file for complete search history.

(56) References Cited

U.S. PATENT DOCUMENTS 10,443,440 B2 10/2019 Socha et al.
10,830,139 B2 11/2020 Hendrickson
11,384,659 B2 7/2022 Morenko
2005/0199445 A1 9/2005 Zalewski et al.
2013/0189071 A1 7/2013 Durocher et al.
2024/0003262 A1 1/2024 Lefebvre et al.

FOREIGN PATENT DOCUMENTS

EP 3543479 A1 9/2019

OTHER PUBLICATIONS

Search Report issued in European Patent Application No. 25199200.4; Date of Mailing Jan. 22, 2026 (8 pages).

*Primary Examiner* — Courtney D Heinle
*Assistant Examiner* — John S Hunter, Jr.
(74) *Attorney, Agent, or Firm* — CANTOR COLBURN LLP

(57) ABSTRACT

A boss with which a component of a gas turbine engine is attachable is provided. The boss includes a base comprising inboard and outboard base portions, an inner wall extendible from the inboard base portion and along the component to surround a seal of the component and having an interior diameter configured to compress the seal radially inwardly and a heat shield. The heat shield is integrally extendible from the outboard base portion and along the component to surround the inner wall at a distance to define a cavity with the inner wall. The heat shield includes a distal edge portion having a terminal diameter less than a diameter of the outboard base portion.

12 Claims, 6 Drawing Sheets

BOSS WITH INTEGRAL FIRE PROTECTION

BACKGROUND

The present disclosure relates gas turbine engines and, more particularly, to a boss with integral fire protection of a gas turbine engine.

A turbine is used to generate power for propulsion, in some cases, by turning propellors, fans or helicopter blades through a gearbox. In some instances, the gearbox output is used to power electrical generators. In a gas turbine engine, fuel and compressed oxygen are combusted in a combustor to produce a high-temperature and high-pressure fluid. This fluid enters a turbine and interacts with rows or stages of turbine blades and vanes. This interaction causes the stages of turbine blades to rotate a rotor. The rotor rotation drives a compressor to compress the oxygen for the combustor and, as noted above, can be used to drive operations of a generator to produce electricity or for propulsion.

BRIEF DESCRIPTION

According to an aspect of the disclosure, a boss with which a component of a gas turbine engine is attachable is provided. The boss includes a base comprising inboard and outboard base portions, an inner wall extendible from the inboard base portion and along the component to surround a seal of the component and having an interior diameter configured to compress the seal radially inwardly and a heat shield. The heat shield is integrally extendible from the outboard base portion and along the component to surround the inner wall at a distance to define a cavity with the inner wall. The heat shield includes a distal edge portion having a terminal diameter less than a diameter of the outboard base portion.

In accordance with additional or alternative embodiments, the base, the inner wall and the heat shield are additively manufactured together, the seal is non-metallic and the base, the inner wall and the heat shield are metallic.

In accordance with additional or alternative embodiments, at least one or more of radial ribs extending at least between the inner wall and the heat shield and tangential ribs extending at least between the inner wall and the heat shield.

In accordance with additional or alternative embodiments, the at least one or more of the radial ribs and the tangential ribs are formed to define openings.

In accordance with additional or alternative embodiments, the terminal diameter of the distal edge portion is equal to or greater than an outermost diameter of the seal in an uncompressed state.

In accordance with additional or alternative embodiments, the terminal diameter of the distal edge portion is equal to or less than the interior diameter of the inner wall.

In accordance with additional or alternative embodiments, the distal edge portion has a conical shape and the heat shield has at least one or more of a cylindrical shape with a curved transition to the distal end portion, a cylindrical shape with an angular transition to the distal edge portion and a bowed shaped with a smooth transition to the distal edge portion.

In accordance with additional or alternative embodiments, the heat shield includes at least one or more of a serpentine portion, a concave portion, and inwardly extending fins and/or outwardly extending fins.

In accordance with additional or alternative embodiments, the boss further includes fireproof and/or fire-resistant material in at least the cavity.

According to an aspect of the disclosure, an additively manufactured metallic boss with which a component of a gas turbine engine is attachable is provided. The additively manufactured metallic boss includes a base including inboard and outboard base portions, an inner wall extendible from the inboard base portion and along the component to surround a non-metallic seal of the component and having an interior diameter configured to compress the non-metallic seal radially inwardly, a heat shield and fireproof and/or fire-resistant material. The heat shield is integrally extendible from the outboard base portion and along the component to surround the inner wall at a distance to define a cavity with the inner wall. The heat shield includes a distal edge portion having a terminal diameter less than a diameter of the outboard base portion. The fireproof and/or fire-resistant material is in at least the cavity.

In accordance with additional or alternative embodiments, the additively manufactured metallic boss further includes at least one or more of radial ribs extending at least between the inner wall and the heat shield and tangential ribs extending at least between the inner wall and the heat shield.

According to an aspect of the disclosure, a gas turbine engine boss assembly is provided and includes a transfer tube including first and second flanges extending radially outwardly from and proximate to a transfer tube end, a seal disposable between the first and second flanges and a boss. The boss includes a base including inboard and outboard base portions, an inner wall extendible from the inboard base portion and along the transfer tube to surround the first and second flanges and the seal and having an interior diameter configured to compress the seal radially inwardly and a heat shield. The heat shield is integrally extendible from the outboard base portion and along the transfer tube to surround the inner wall at a distance to define a cavity with the inner wall. The heat shield includes a distal edge portion having a terminal diameter less than a diameter of the outboard base portion.

In accordance with additional or alternative embodiments, the base, the inner wall and the heat shield are additively manufactured together and the seal is non-metallic and the base, the inner wall and the heat shield are metallic.

In accordance with additional or alternative embodiments, the boss further includes at least one or more of radial ribs extending at least between the inner wall and the heat shield and tangential ribs extending at least between the inner wall and the heat shield.

In accordance with additional or alternative embodiments, the at least one or more of the radial ribs and the tangential ribs are formed to define openings.

In accordance with additional or alternative embodiments, the terminal diameter of the distal edge portion is equal to or greater than an outermost diameter of the seal in an uncompressed state.

In accordance with additional or alternative embodiments, the terminal diameter of the distal edge portion is equal to or less than the interior diameter of the inner wall.

In accordance with additional or alternative embodiments, the distal edge portion has a conical shape and the heat shield has at least one or more of a cylindrical shape with a curved transition to the distal end portion, a cylindrical shape with an angular transition to the distal edge portion and a bowed shaped with a smooth transition to the distal edge portion.

In accordance with additional or alternative embodiments, the heat shield includes at least one or more of a serpentine portion, a concave portion, and inwardly extending fins and/or outwardly extending fins.

In accordance with additional or alternative embodiments, the boss further includes fireproof and/or fire-resistant material in at least the cavity.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
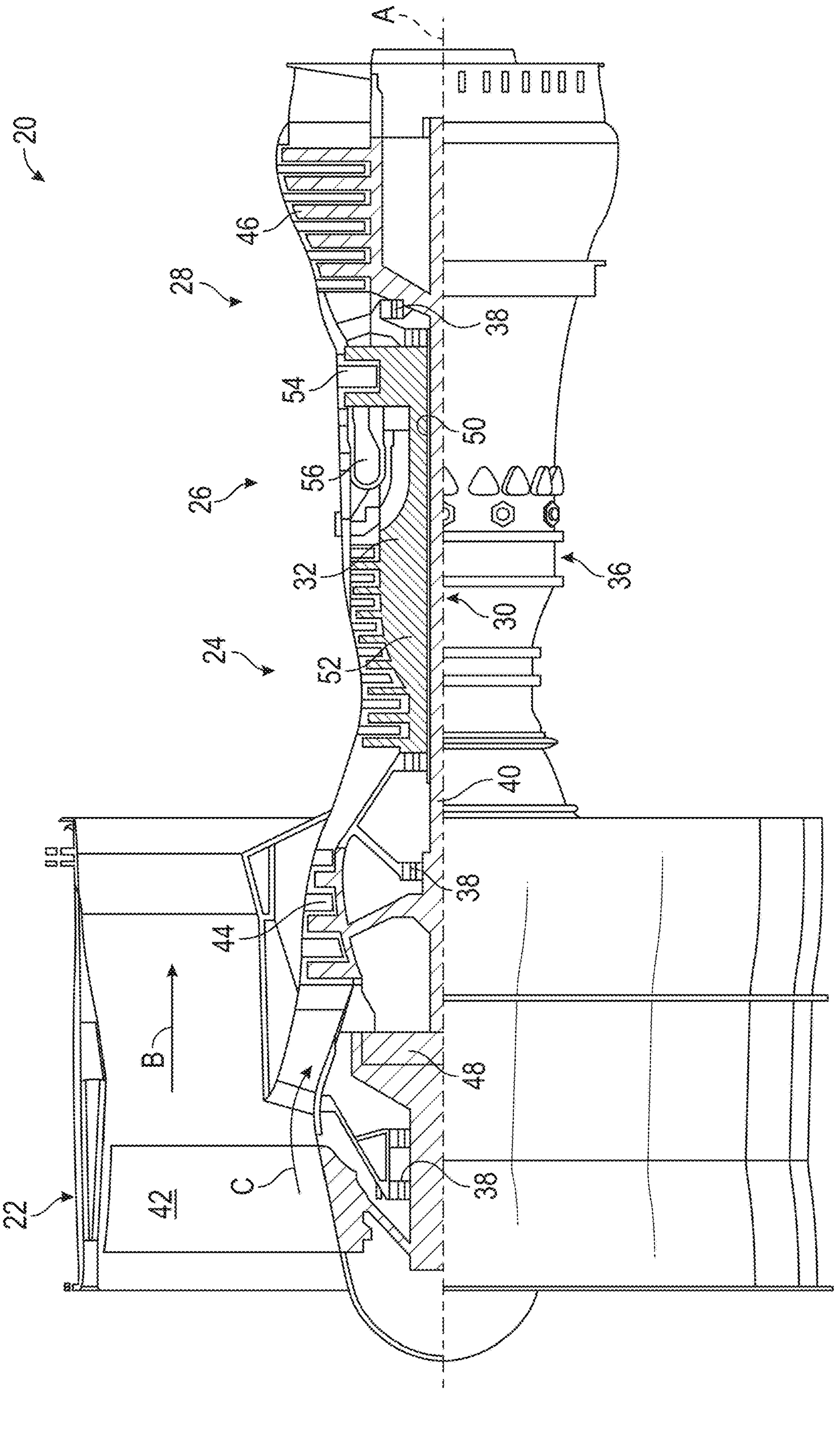
FIG. 1 is a partial cross-sectional view of a portion of an exemplary gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Recently, fire testing requirements for gas turbine engines, such as the gas turbine engine 20 of FIG. 1, have become more stringent with a result being that new engine programs are often required to perform more extensive and intense fire testing during the development phase of the program. This commonly leads to the unexpected introduction of additional fire protection (fire shields, fire blankets or material changes) late in the engine program to meet certification requirements. In particular, one of the problematic areas for fire testing are non-metallic seals (i.e., silicone, plastic, fluorocarbon, etc.) that are susceptible to fire damage. If critical seals are compromised during a fire test or a real-world engine fire, it is possible that flammable liquid such as fuel or engine oil could be released and create a fire hazard. A traditional way to protect these seals is to increase the thickness of the metal surrounding the seal or to add protective shielding/blankets. However, these solutions add weight and cost to the engine which is undesirable and cause delays to the program schedule.

Therefore, a need exists for gas turbine engines with improved fire protection for seals to meet certification requirements without adding substantial weight and costs.

Thus, as will be discussed below, boss of a gas turbine engine that contains a seal is provided with an additively manufactured heat shield. An area of the boss where the non-metallic seal sits is formed with a thin metal shield element that provides an air gap for thermal isolation of the sealing area. The shield element extends in a conical or similar shape above the sealing area and closes in at the top of the boss to provide fire protection from above the sealing area. The heat shield provides for a significant increase in fire resistance for the boss and the seal contained therein and comes at no significant cost increases.

Additional or alternative embodiments of the heat shield can include radial and/or tangential supports or ribs connecting the heat shield to the boss. In some cases, this additional support may be necessary to support the heat shield under high thermal distortion or if the shield material is approaching its melting point. The tangential ribs in particular can provide more flexibility to accommodate significant thermal distortion which may be advantageous for materials that have a high coefficient of thermal expansion. Holes or openings can be made in the radial and/or tangential supports or ribs to allow for improved air flow through the cavity, improving fire resistance and reducing the weight of the overall design.

Figure 2A:
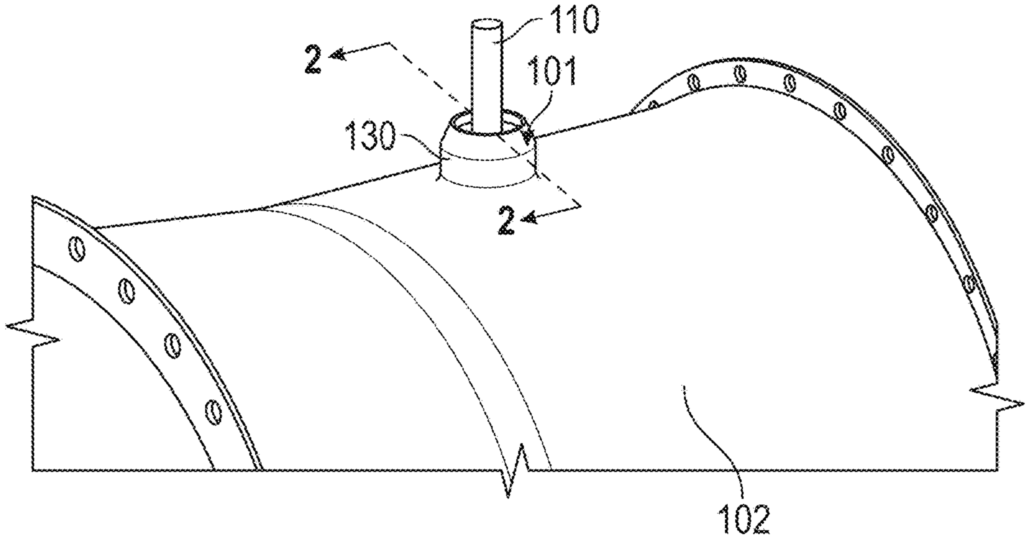
FIG. 2A is a perspective view of a casing of a gas turbine to which a boss assembly is connected in accordance with embodiments.
Figure 2B:
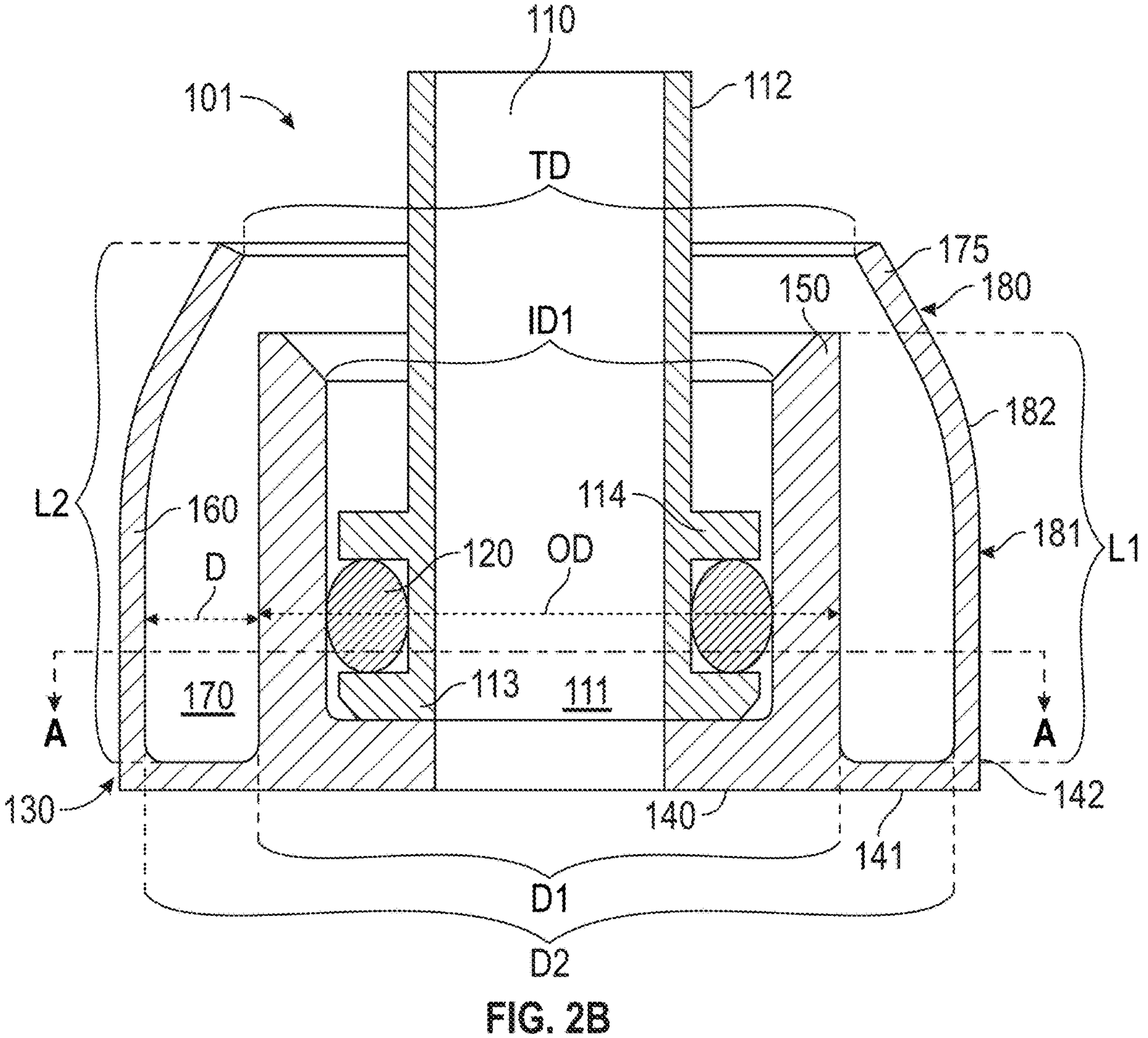
FIG. 2B is a cross-sectional view of a gas turbine engine boss assembly including a boss with a heat shield of the boss assembly of FIG. 2A taken along line 2-2 of FIG. 2A in accordance with embodiments.

With reference to FIGS. 2A and 2B, a gas turbine engine boss assembly 101 is provided and can be disposed on, attached to/with or otherwise connected to/with a casing 102 of a gas turbine engine, such as the gas turbine engine 20 of FIG. 1. The gas turbine engine boss assembly 101 includes a gas turbine engine component, such as a transfer tube 110, a seal 120 and a boss 130 (for clarity and brevity, the following description will relate to the case in which the gas turbine engine component is the transfer tube 110, though it is to be understood that the gas turbine engine component can be provided as other gas turbine engine features).

The transfer tube 110 is generally provided to carry oil or fuel and includes a tubular body with a transfer tube end 111, an exterior surface 112 and first and second flanges 113 and 114 that extend radially outwardly from and proximate to the transfer tube end 111. The seal 120 can be provided as a non-metallic seal and can be formed of flouro-silicone, for example. The seal 120 is disposable between the first and second flanges 113 and 114.

The boss 130 includes a base 140, including an inboard base portion 141 having a first diameter D1 and an outboard base portion 142 having a second diameter D2, which is larger than the first diameter D1. The boss 130 further includes an inner wall 150 and a heat shield 160. The inner wall 150 is extendible from the inboard base portion 141 and along a first longitudinal length L1 of the transfer tube 110 (i.e., a longitudinal length that extends longitudinally from the transfer tube end 111) to surround the first and second flanges 113 and 114 and the seal 120. The inner wall 150 has an interior diameter ID1 that is configured and sized to compress the seal 120 radially inwardly and toward the exterior surface 112 of the transfer tube 110. The heat shield 160 is integrally extendible from the outboard base portion 142 and along a second longitudinal length L2 of the transfer tube 110 (i.e., a longitudinal length that extends longitudinally from the transfer tube end 111), where the second longitudinal length L2 exceeds the first longitudinal length L1. The heat shield 160 is thus disposable to surround the inner wall 150 at a distance D to define a cavity 170 between an interior surface of the heat shield 160 and an exterior surface of the inner wall 150. The heat shield 160 includes a distal edge portion 175 having a terminal diameter TD that is less than the second diameter D2 of the outboard base portion 142.

In accordance with embodiments, the base 140, the inner wall 150 and the heat shield 160 of the boss 130 can be additively manufactured together and, in these or other cases in which the seal 120 is non-metallic, the base 140, the inner wall 150 and the heat shield 160 of the boss 130 can be metallic.

The terminal diameter TD of the distal edge portion 175 can be substantially equal to or greater than an outermost diameter OD of the seal 120 with the seal 120 in an uncompressed state (as illustrated in FIG. 2B, the seal 120 is in its compressed state and the OD extends beyond the inner diameter ID1 of the inner wall 150). In this condition, as the transfer tube 110 and the seal 120 are attached to/with the boss 130 and/or as the boss 130 is attached to/with the transfer tube 110 and around the seal 120, the distal edge portion 175 can pass over and around the seal 120 without contacting the seal 120 and without risking damage to the seal 120. In accordance with alternative embodiments, the terminal diameter TD of the distal edge portion 175 can be substantially equal to or less than the interior diameter ID1 of the inner wall 150. In this condition, as the transfer tube 110 and the seal 120 are attached to/with the boss 130 and/or as the boss 130 is attached to/with the transfer tube 110 and around the seal 120, the distal edge portion 175 can either contact and compress the seal 120 during the attachment process or, during/prior to the attachment process, the seal 120 can be compressed so that the distal edge portion 175 can pass over and around the seal 120 without contacting the seal 120 and without risking damage to the seal 120.

Figure 3:
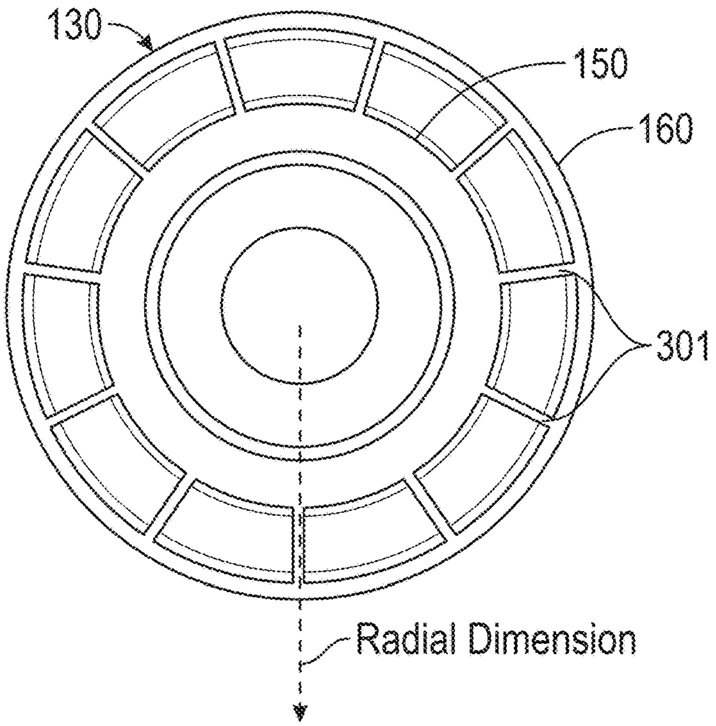
FIG. 3 is a cross sectional view of the boss of FIG. 2B taken along line A-A of FIG. 2B with radial ribs in accordance with embodiments.
Figure 4:
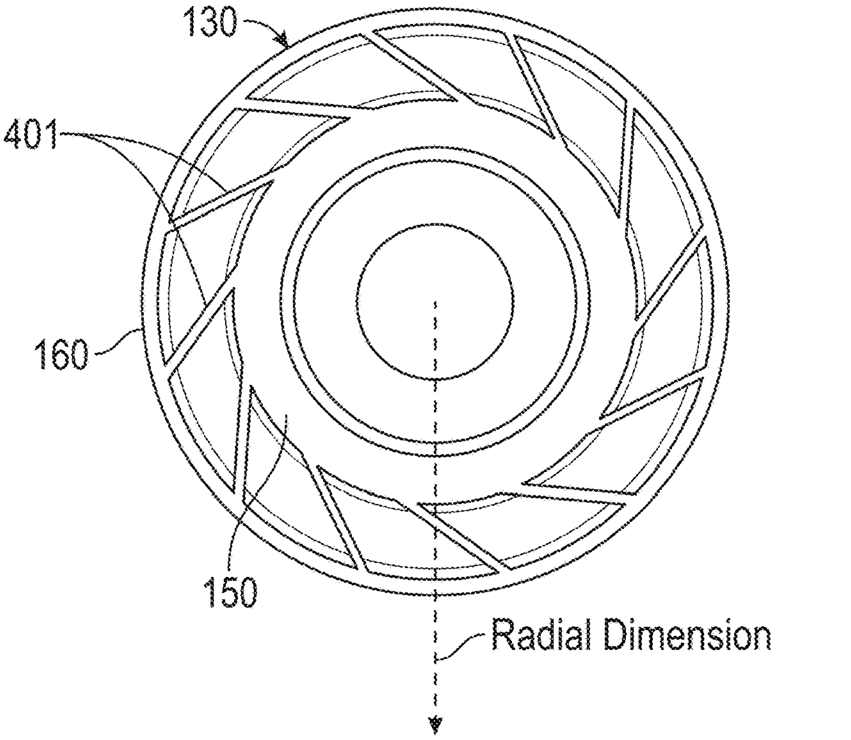
FIG. 4 is a cross sectional view of the boss of FIG. 2B taken along line A-A of FIG. 2B with tangential ribs in accordance with embodiments.
Figure 5:
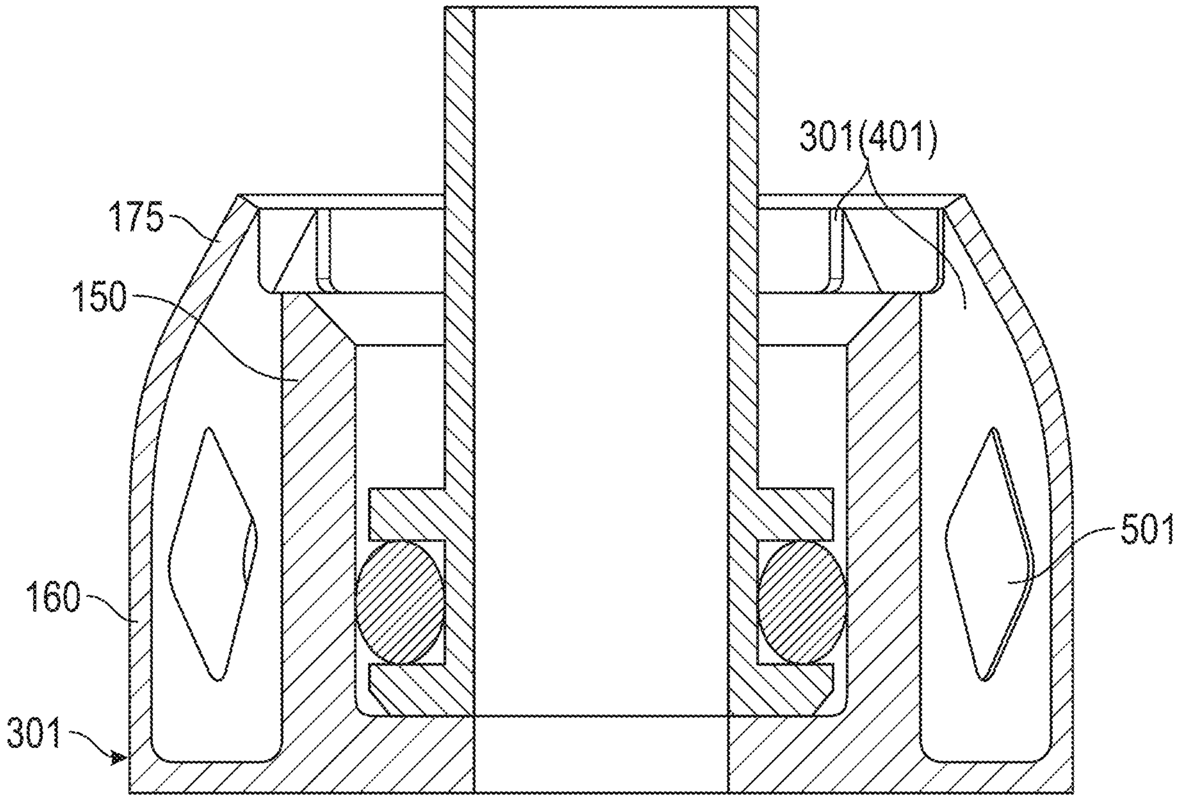
FIG. 5 is a cross-sectional view of a gas turbine engine boss assembly including a boss with a heat shield and radial ribs defining openings of the boss assembly of FIG. 2A taken along line 2-2 of FIG. 2A in accordance with embodiments.

With continued reference to FIGS. 2A and 2B and with additional reference to FIGS. 3 and 4 and to FIG. 5, the boss 130 can further include at least one or more of radial ribs 301 (see FIG. 3) that extend in parallel with a radial dimension at least between the inner wall 150 and the heat shield 160 and/or tangential ribs 401 (see FIG. 4) that extend at an angle with respect to the radial dimension at least between the inner wall 150 and the heat shield 160. As shown in FIGS. 3 and 5, the radial ribs 301 can also extend along the longitudinal axis of the transfer tube 110 between a distal edge of the inner wall 150 and the distal edge portion 175 of the heat shield 160. Similarly, the tangential ribs 401 can also extend along the longitudinal axis of the transfer tube 110 between the distal edge of the inner wall 150 and the distal edge portion 175 of the heat shield 160. As shown in FIG. 5, the at least one or more of the radial ribs 301 and the tangential ribs 401 can be formed to define openings 501 to provide for at least improved airflow and reduced weight (while the radial ribs 301 are illustrated in FIG. 5, it is to be understood that the openings 501 can be similarly formed in the tangential ribs 401 and that a separate illustration of this feature is not needed).

Figure 6:
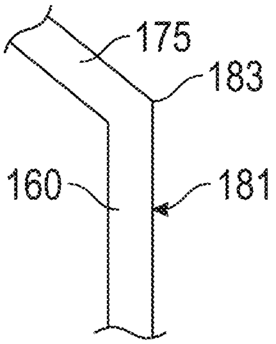
FIG. 6 is a schematic illustration of a portion of a heat shield with an angular transition in accordance with embodiments.
Figure 7:
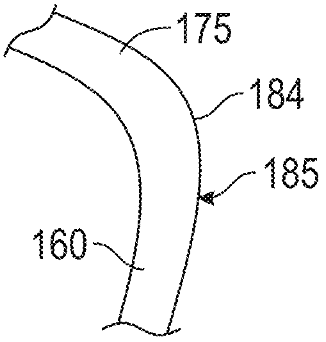
FIG. 7 is a schematic illustration of a portion of a bowed heat shield with a smooth transition in accordance with embodiments.

With continued reference to FIGS. 2A and 2B and with additional reference to FIGS. 6 and 7, the distal edge portion 175 can have a conical shape 180 and, in these or other cases, the heat shield 160 can have at least one or more of a cylindrical shape 181 with a curved transition 182 to the distal end portion 175 (see FIG. 2B), a cylindrical shape 181 with an angular transition 183 to the distal edge portion 175 (see FIG. 6) and a bowed shaped 184 with a smooth transition 185 to the distal edge portion 175 (see FIG. 7). It is to be understood, however, that these various embodiments are not exclusive and that other shapes and configurations of the heat shield are possible.

Figure 8:
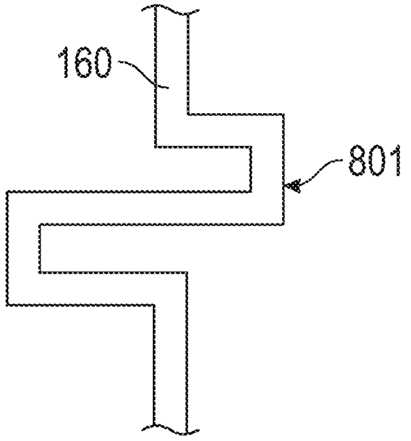
FIG. 8 is a schematic illustration of a portion of a heat shield with a serpentine portion in accordance with embodiments.
Figure 9:
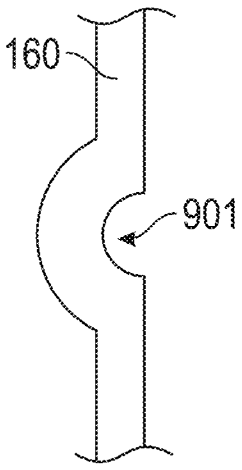
FIG. 9 is a schematic illustration of a portion of a heat shield with a concave portion in accordance with embodiments.
Figure 10:
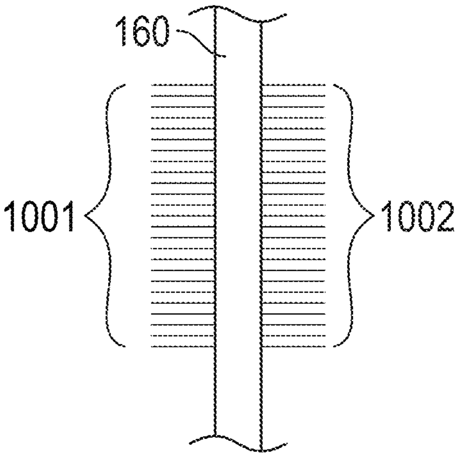
FIG. 10 is a schematic illustration of a portion of a heat shield with inwardly or outwardly extending fins in accordance with embodiments.

With continued reference to FIGS. 2A and 2B and with additional reference to FIGS. 8-10, the heat shield 160 can also include at least one or more of a serpentine portion 801 (see FIG. 8) at least for improved heat transfer or dissipation, a concave portion 901 (see FIG. 9) at least for flame trapping and improved heat transfer or dissipation and inwardly extending fins 1001 and outwardly extending fins 1002 (see FIG. 10) at least for improved heat transfer or dissipation.

Figure 11:
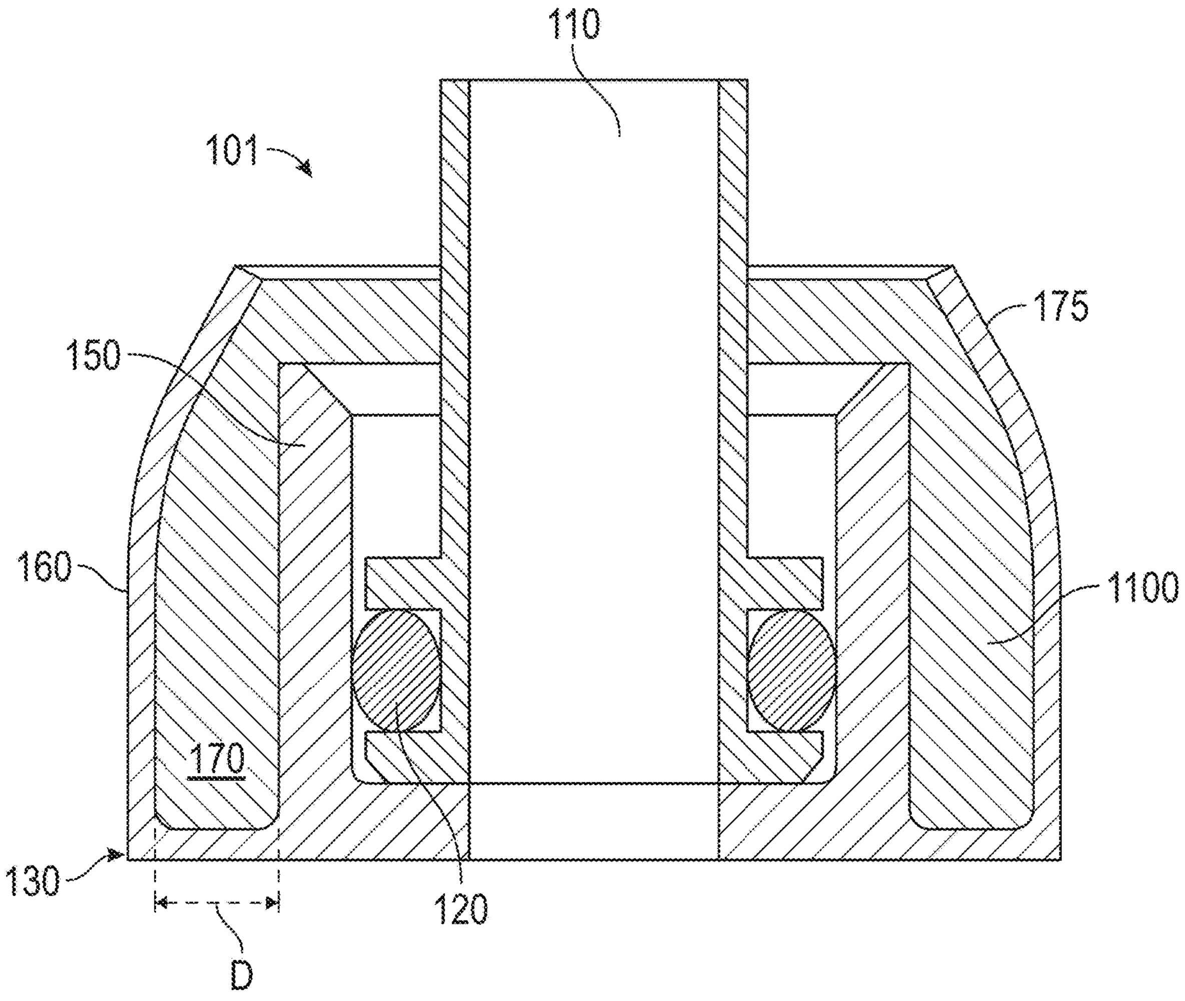
FIG. 11 is a cross-sectional view of a gas turbine engine boss assembly including a boss with a heat shield and a fireproof and/or fire-resistant material of the boss assembly of FIG. 2A taken along line 2-2 of FIG. 2A in accordance with embodiments.

With continued reference to FIGS. 2A and 2B and with additional reference to FIG. 11, the boss 130 can further include fireproof and/or fire-resistant material 1100 disposable in at least the cavity 170 and, in some cases, the additional cavity between the distal edge of the inner wall 150 and the distal edge portion 175 of the heat shield 160 as well as space between the distal edge portion 175 of the heat shield 160 and the transfer tube 110. In accordance with embodiments, the fireproof and/or fire-resistant material 1100 can include or be provided as at least one or more of epoxies, aramid fibers such as Nomex™, ceramic fibers, etc. The addition of the fireproof and/or fire-resistant material 1100 is enabled herein by the presence of the cavity 170 (and the additional cavity) and is not generally possible in conventional assemblies that do not provide for a cavity.

Technical effects and benefits of the present disclosure are the provision of a seal of a gas turbine engine that contains a seal with an additively manufactured heat shield that can provide for a significant increase in fire resistance for the boss and the seal and comes at no significant weight and/or cost increases. Radial and/or tangential supports or ribs can add structural integrity to the boss and holes or openings in those can provide for improved airflow and improved fire resistance while reducing weight.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A boss with which a component of a gas turbine engine is attachable, the boss comprising:

a base comprising inboard and outboard base portions;

an inner wall extendible from the inboard base portion and along the component to surround a seal of the component and having an interior diameter configured to compress the seal radially inwardly; and a heat shield integrally extendible from the outboard base portion and along the component to surround the inner wall at a distance such that an entirety of the heat shield is monolithically connected to the entirety of the inner wall solely by way of the base to define, with the inner wall, a cavity extending from the inboard base portion along the entirety of the inner wall, the heat shield comprising a distal edge portion having a terminal diameter less than a diameter of the outboard base portion.

2. The boss according to claim 1, wherein:

the base, the inner wall and the heat shield are additively manufactured together, and the seal is non-metallic and the base, the inner wall and the heat shield are metallic.

3. The boss according to claim 1, wherein the terminal diameter of the distal edge portion is equal to or greater than an outermost diameter of the seal in an uncompressed state.

4. The boss according to claim 1, wherein the terminal diameter of the distal edge portion is equal to or less than the interior diameter of the inner wall.

5. The boss according to claim 1, wherein:

the distal edge portion has a conical shape, and the heat shield has at least one or more of a cylindrical shape with a curved transition to the distal end portion, a cylindrical shape with an angular transition to the distal edge portion and a bowed shaped with a smooth transition to the distal edge portion.

6. The boss according to claim 1, wherein the heat shield comprises at least one or more of a serpentine portion, a concave portion, and inwardly extending fins and/or outwardly extending fins.

7. A gas turbine engine boss assembly, comprising:

a transfer tube having a longitudinal axis and a radial dimension perpendicular to the longitudinal axis, the transfer tube comprising:

a transfer tube end defined relative to the longitudinal axis; and a first flange extending radially outwardly along the radial dimension from the transfer tube end; and a second flanges extending radially outwardly along the radial dimension from and proximate to the transfer tube end;

a seal disposable between the first and second flanges along the longitudinal axis; and a boss, comprising:

a base comprising an inboard base portion, which has a first diameter defined along the radial dimension, and an outboard base portion, which surrounds the inboard base portion and which has a second diameter that is larger than the first diameter and is defined along the radial dimension;

an inner wall extending along the longitudinal axis from the inboard base portion and along the transfer tube to surround the first and second flanges and the seal and having an interior diameter configured to compress the seal radially inwardly; and a heat shield integrally extending along the longitudinal axis from the outboard base portion and along the transfer tube to surround the inner wall at a distance such that an entirety of the heat shield is monolithically connected to the entirety of the inner wall solely by way of the base to define, with the inner wall, a cavity extending along the longitudinal axis from the inboard base portion along the entirety of the inner wall, the heat shield comprising a distal edge portion, which is distant from the outboard base portion and which has a terminal diameter less than the second diameter.

8. The gas turbine engine boss assembly according to claim 7, wherein:

the base, the inner wall and the heat shield are additively manufactured together, and the seal is non-metallic and the base, the inner wall and the heat shield are metallic.

9. The gas turbine engine boss assembly according to claim 7, wherein the terminal diameter of the distal edge portion is equal to or greater than an outermost diameter of the seal in an uncompressed state.

10. The gas turbine engine boss assembly according to claim 7, wherein the terminal diameter of the distal edge portion is equal to or less than the interior diameter of the inner wall.

11. The gas turbine engine boss assembly according to claim 7, wherein:

the distal edge portion has a conical shape, and the heat shield has at least one or more of a cylindrical shape with a curved transition to the distal end portion, a cylindrical shape with an angular transition to the distal edge portion and a bowed shaped with a smooth transition to the distal edge portion.

12. The gas turbine engine boss assembly according to claim 7, wherein the heat shield comprises at least one or more of a serpentine portion, a concave portion, and inwardly extending fins and/or outwardly extending fins.

* * * * *